Oct. 10, 1933.   N. E. BROOKE   1,929,769
ANTISKID CHAIN
Filed April 28, 1933   2 Sheets-Sheet 1
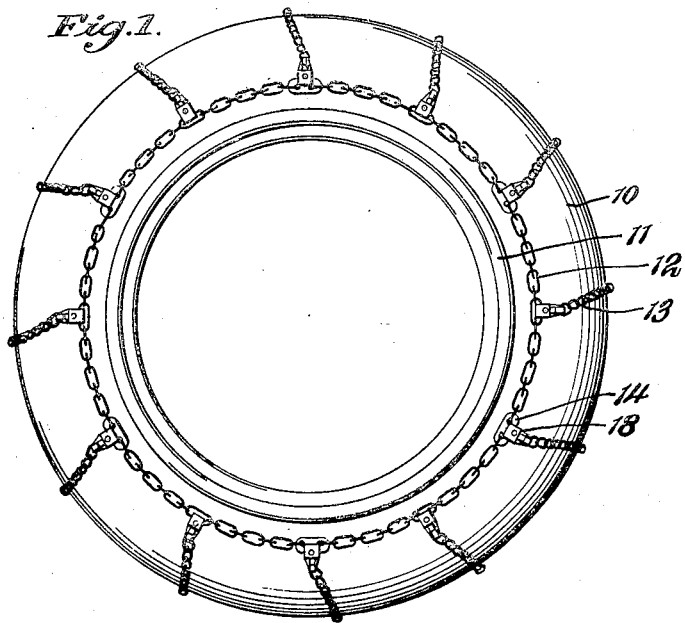
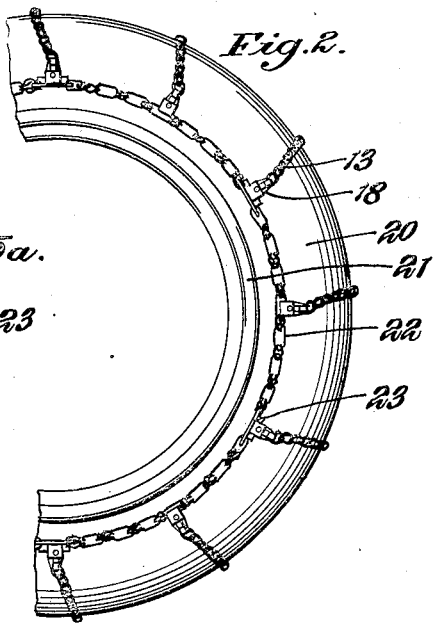
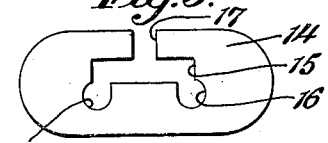
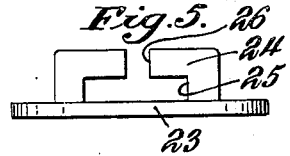
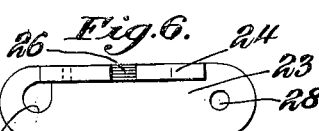
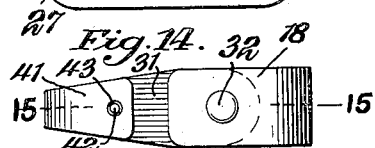
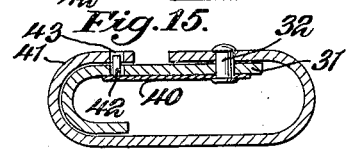
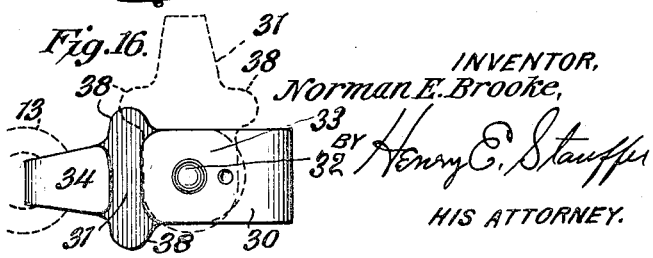
INVENTOR,
Norman E. Brooke,
BY Henry E. Stauffer
HIS ATTORNEY.

Oct. 10, 1933.  N. E. BROOKE  1,929,769
ANTISKID CHAIN
Filed April 28, 1933  2 Sheets-Sheet 2
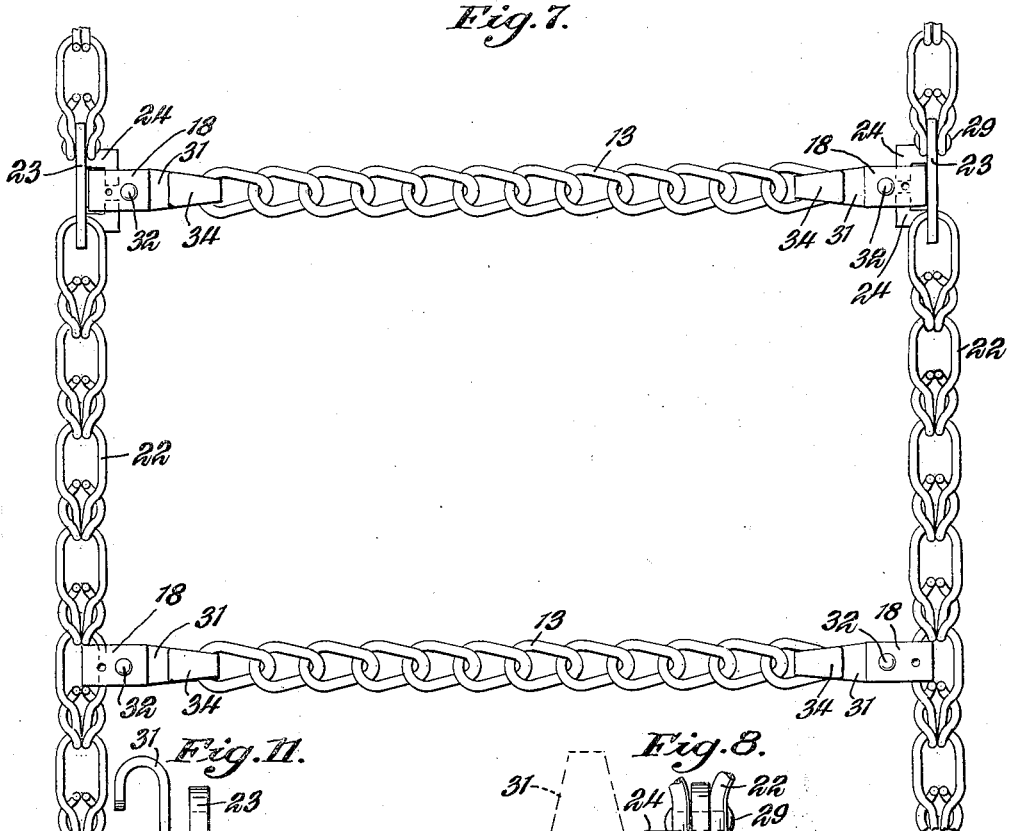
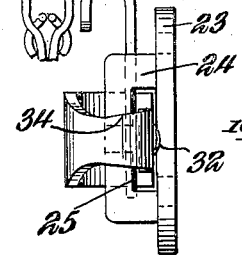
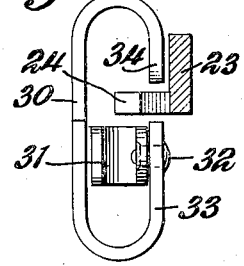
INVENTOR.
Norman E. Brooke,
BY
Henry E. Stauffer
HIS ATTORNEY.

Patented Oct. 10, 1933

1,929,769

UNITED STATES PATENT OFFICE 1,929,769

ANTISKID CHAIN

Norman E. Brooke, Washington, D. C.

Application April 28, 1933. Serial No. 668,439

16 Claims. (Cl. 152—14)

The invention relates to anti-skid chains such as are commonly used on the wheels of automobiles, particularly those having pneumatic tires, to prevent the wheels slipping on the road.

While several independent features of invention are involved, these all cooperate to produce a non-skid chain having special characteristics which make it possible to remove or replace the chain as a whole; or to remove and replace the cross chains alone, without the use of special tools or implements.

One feature of the invention is a special connector by which the cross chains may be readily removed from or secured to the side chains without the use of special tools, and by reason of which it is possible to easily and quickly remove or replace these cross chains.

Another feature of the invention is a special device or link for connecting the ends of side chains, or sections of the side chains, without the use of special tools.

A further feature of the invention is the combination of the connectors, the special links, the side chains and the cross chains, so that the connectors will cooperate with the other parts to prevent the side chains becoming disengaged without first removing one or more of the connectors of the cross chains.

With these and other objects in mind, reference is hereby made to the accompanying drawings, the several figures of which may be briefly described as follows:

Fig. 1 is a side view of an automobile wheel having mounted thereon an anti-skid chain embodying my invention, the side chains of which are so-called straight link chains.

Fig. 2 is a similar view of a portion of an automobile wheel having thereon an anti-skid chain, the side chains of which are of the so-called lock link type.

Fig. 3 is a plan view of one of the special links used to join the ends or sections of the side chains of the straight link type of side chains.

Fig. 4 is an edge view of the link shown in Fig. 3, the view being taken as though looking down upon the top of Fig. 3.

Fig. 5 is a view of a special link similar to that shown in Figs. 3 and 4, but with part of the body bent at right angles to the other part, so as to particularly adapt the same for use with chains of the lock link type.

Fig. 5a is a view looking at the end of Fig. 5, taken from the left.

Fig. 6 is a plan view of the link shown in Figs. 5 and 5a.

Fig. 7 is a plan view of a section of an antiskid chain using side chains of the lock link type, with cross chains and connectors between the side chains.

Fig. 8 is a plan view of the connector proper somewhat enlarged, and connected to both side chain and cross chain.

Fig. 9 is a side view of the link and cooperating chains shown in Fig. 8.

Fig. 10 is a section of the connector shown in Fig. 8, the section being taken on the line 10—10 of Fig. 8.

Fig. 11 is an end view of connector and special link shown in Fig. 8, the connector being shown in an intermediate position which it assumes while being placed in operative position.

Fig. 12 is a plan view of the connector and link, the view being shown at right angles to that of Fig. 11, and showing a position which the parts assume while being assembled.

Fig. 13 illustrates modified form of connector.

Fig. 14 is a plan view of another modified connector.

Fig. 15 is a cross section of the connector in Fig. 14 taken on the line 14—14 of Fig. 14.

Fig. 16 is a further modified connector, the same embodying a special guard to prevent accidental displacement of one of the parts.

Referring to Fig. 1, the numeral 10 indicates an ordinary pneumatic or other rubber tire mounted upon a rim 11. On the wheel is an anti-skid chain having side chains 12, only one of which is here shown, and cross chains 13, of which twelve are shown in this figure, although the number may be varied according to the requirements of the situation. The side chains which are here illustrated are ordinary straight link chains.

The several sections of the side chains are shown connected together by special links 14, each having in the body thereof a slot 15, two seats 16 for the end links of the chain sections, and an opening 17 through which the links may be inserted, all as more particularly shown in Figs. 3 and 4.

The numeral 18 indicates the special connectors heretofore referred to, some of which are here shown hooked into the special links used to connect the sections of the chain, and others engaged with the regular links of the side chains. However, this arrangement is merely illustrative for all of the hooks may be engaged in special links such as 18; or all of the hooks may be engaged with the regular links of the side chains.

Referring to Fig. 2, the arrangement is substantially the same as that shown in Fig. 1. Here 20 represents the tire, and 21 the rim. The side chains 22 are here made up of so-called lock links shown more clearly in Fig. 7, in which all of the links lie in the same plane and rest against the sides of the tire. Here the special links used to connect the side chains, or the sections thereof, or both, are marked 23; the details of their construction is given more particularly in Figs. 5, 5a and 6. They differ from the links 14 of Figs. 1 and 3 in that the slotted side is turned at an angle to the base, shown here as being at approximately right angles to the body of the link as indicated at 24.

This portion 24 is provided with a slot 25, which is substantially like the slot 15 of the link shown in Fig. 3, and the opening 26 through which the links of the side chains are adapted to pass. The base portion of this link 23, in the particular form here shown, has at one end thereof, Fig. 6, a seat 27 to receive the end link of the chain, or one of the sections thereof; but in this form the other end of the link is provided with a hole 28 through which is to be passed a pin 29, Fig. 8, such as ordinarily used with chains of the lock link form, for, as shown more particularly in Figs. 7, 8 and 9, these chains are so constructed that the links thereof only have one end that may be supported as ordinary links are supported, the other end being engaged with the succeeding link by a special hook, so that it is impossible to support this end of the link in a seat such as 27, Fig. 6. Of course, where chains are used which have ordinary links at both ends they can all be supported in openings such as 27.

The connectors 18 are used to connect the cross chains to the side chains, as shown enlarged in Figs. 8, 9 and 10; but when used with the special links of Figs. 3 and 5, they serve also to hold the links of the side chains in place, as will be more fully described below.

These hooks or connectors have been given the general reference character 18, particularly in Figs. 1 and 2, but they are made up of several parts to which it will be necessary to refer more in detail. Specifically considered, these hooks consist of two elements, a body 30, Figs. 8, 9 and 10, the ends of which are bent substantially as shown in these figures; the other, a tongue or gate 31, which is secured to the part 30 by a pivot 32. The body of the hook 30 has one end 33 thereof bent back upon itself so that the end lies approximately parallel to the body portion 30. This end is of sufficient width to engage substantially the entire length of the sides of the chain links as shown in Fig. 7, and to occupy substantially the entire width of the openings 15 and 25 of the special links 14 and 23 of Figs. 3 and 5. The other end 34 of the connector is likewise bent back upon itself so that the end thereof lies substantially parallel with the body portion 30, and in line, or substantially in line, with the bent portion 33 of the wide part of the hook; but a space is left between the end thereof and the end of part 33, so that the cross chain links can be inserted and withdrawn. The end 34 of the connector is made narrower than the end 33, particularly at the bend thereof, so as to fit in a satisfactory way into the end link of the chain 13. This is shown particularly in Fig. 7, and still further in Figs. 8, 9 and 10.

The tongue or gate 31 of the connector is mounted at one end upon the pivot 32, which passes through the upper member 33, and the other end thereof 35, Figs. 9 and 10, is bent back upon itself with the end thereof substantially parallel to the body; and the construction is such that this tongue or gate 31 may be swung to lie directly within the front portion 34 of the member 30 when in use.

Referring to Figs. 8, 9 and 10, the tongue or gate 31 may be provided with a locking device, such for instance as the projection 36 on the body of the hook and the recess 37 on the tongue or gate, the material being elastic to yield sufficiently for the projection and depression to lock when the tongue is occupying the normal position, as in Figs. 9 and 10, but to yield to permit the tongue or gate 31 to open, as shown in broken lines in Fig. 8.

Fig. 13 shows a form of connector in which the tongue or gate 31 is pivoted on the outside of the body portion 30, instead of on the inside thereof, as in the other forms. Inasmuch as this operates in substantially the same manner as the other forms, no further description thereof seems to be necessary.

Instead of this particular form of lock, a different locking arrangement, such as that shown in Figs. 14 and 15, may be used. Here the tongue or gate 31 has fixed upon the inner side thereof a spring 40 mounted on the pivot 32 and carrying upon the other end a pin 41, which passes loosely through an opening 42 in the gate 31 and projects into an opening 43 in the portion 34 of the connector. These locking devices are merely illustrative; other means may be employed, or the lock may be entirely omitted.

Fig. 16 illustrates another modified connector. This consists of the same body 30, tongue or gate 31, and pivot 32 as the other forms; but the tongue or gate is provided with enlargements 38, one on either side thereof, which serve as guards to prevent the possibility of the link of the cross chain accidentally displacing the gate. These enlargements 38 are made wide enough to extend over the opening between the parts 33 and 34; and extend from the sides of the tongue or gate a distance sufficiently to prevent the link of the cross chain being passed thereover. While these guards are not always necessary they may be used if circumstances require, and they may be in the form of projections, as shown, or in any other form that will perform the function. To remove the connector, it is only necessary to move the link of the chain past the end of the gate, whereupon the gate may be opened by hand, then the link can be removed from the hook in the usual way.

As stated above, one aspect of the invention contemplates the use of special links for connecting the ends of the sections of the side chains, which links function in connection with the connectors for the cross chains so as to hold the links of the side chains in position as long as the cross chains are in place. Moreover, these special links may be either of at least two forms, depending upon the type of chain used for side chains. If these side chains are made of straight links, as shown in Fig. 1, then the special links shown in Fig. 3 and 4 are to be used; but if the side chains are of the so-called lock link type, as shown in Figs. 2 and 7, then the special links are preferably, though not necessarily, made with one side turned at an angle to the other, as shown best in Figs. 5, 5a and 6, so that the connector may be easily inserted through the slot in the link as shown in Figs. 8 to 12, inclusive.

But, while these connecting links may assume either of the two forms shown, their operation is the same in both cases. A description of one form will therefore suffice in general for both; and since the form shown in Figs. 5, 5a and 6, and in Figs. 8 to 12, inclusive, is the form which will perhaps be most frequently used, this form will be more particularly referred to in the following description.

Side chains of the lock link type, shown in Figs. 2 and 7, and in Figs. 8, 9 and 10, are quite commonly used in the construction of anti-skid chains. With chains of this form, the links all lie in the same plane, one link being connected with the succeeding one by having the ends of the first pass through the loop of the following link, and then bent back and into the loop of the first link. The result is that the links pivot one upon the other about the point where the ends of the first loop are bent back over the loop of the succeeding link. When such a chain is separated, one section ends in an ordinary link, but the leading end of the other section contains an eye through which it had been connected to the succeeding link.

To accommodate such chains, connecting links such as those shown in Figs. 5, 5a and 6 are used. These have at one end a recess 27 in which rests the plain loop of the end link of the side chain, while the other end is provided with a hole 28 for the reception of a pin 29.

To assemble a chain of this character, the link 23 is attached to that end of the side chain which is connected thereto by the pivot 29, and the other end, or the end of the adjacent section if the side chain is sectional, is then slipped through the slot 26, thence through the longitudinal slot 25, and into the seat 27. There is always a little slack in these chains, or in the sections thereof, so that this connection can easily be made.

With the side chains connected in the manner described, it is then necessary to provide some means for preventing the accidental removal of the link which has been slipped into the slot 27. The connector 18 is used for this purpose. The slot 25 is made of a width to accommodate the wide end 33 of the connector 18, a reasonable amount of play being allowed for ease in assembling.

The connector in this position is shown in Fig. 7, and on an enlarged scale in Fig. 8. In this connection it will be noticed that the end 33 of the hook 18 is wide enough to overlap the seat 27, so that with the link of the chain in the seat 27, and the wide end 33 of the connector 18 resting in the opening 25, it is impossible to remove the link of the side chain from the seat 27, and the same is therefore securely locked in place.

The connector 18 is placed in the slot 25 by turning the connector over and then inserting the narrow end 34 in the slot 25, as shown in Fig. 11, then moving the same through the slot and turning the connector so as to bring the wide end 33 in the slot. The end link of the cross chain 13 is then passed over the end 34 of the connector and moved to a position somewhat as indicated in dotted lines in Figs. 8 and 9. The tongue 31 is then closed, as shown in Fig. 8, and the link of the cross chain then brought to the position shown in Figs. 9 and 10 with the link inside both the hook 34 and the gate 31.

*Operation*

From what has been said, it is clear that the connectors 18 may be used in either of two ways; that is either as means for connecting cross chains in an anti-skid chain in the usual way; or as connectors for such chains in conjunction with the connecting links of the side chains.

Referring more particularly to Fig. 7, and first to the use illustrated in the lower part of that figure, we see that the cross chains are here connected to the side chains by means of these connectors 18, the connectors cooperating with the sides of the links of the side chains, whereby they engage these chains, and support the cross chains 13. These chains as thus mounted may be readily detached and replaced without interfering in any way with the side chains.

One of the purposes of this invention is to make it possible to readily remove and attach these cross chains as used in anti-skid chains in general use. That is, these cross chains 13 with the connectors 18 applied may be used with in any commercial anti-skid chain.

As a matter of fact the connector 18 may be sold and used alone for this purpose, the object being to provide a connector which can be manipulated without the use of special tools and which can be readily engaged and disengaged, thus making it an easy matter to remove or put in position cross chains of ordinary anti-skid chains. To put the connector in place, the tongue or gate 31 is opened to the position shown in dotted lines in Fig. 8; the front or small end 34 is then inserted in the link of the side chain and moved therein until the side of the link rests in the end 34; the connector is then turned over, and moved through the link until the rear or wide end 33 of the connector engages the side of the link.

When the connectors on both sides have been thus inserted, one end of the cross chain 13 is engaged over the front portion 34 and moved therethrough to a position somewhat like that shown in dotted lines in the bottom of Fig. 9, that is beyond the position occupied by the end of the tongue or gate 31; the latter is then closed. The link is then moved back so that it will engage both the end 34 and the tongue 31, as in the position shown in Figs. 9 and 10. With the link in this position it is impossible to turn the gate 31, since it is held in position by the chain link itself. After the one end of the chain has been thus secured, the link at the opposite end of the cross chain is engaged over the end 34 of its connector and brought to position in the same manner. There must, of course, be sufficient play for the cross chain to lengthen sufficiently to engage its end link over the end 34 of the connector, but as these cross chains are usually constructed there is a small amount of excess length or play so that the link may easily be engaged as described.

To remove a cross chain, the operation is simply reversed. The one end of the chain has its end link slipped back to approximately the position shown in dotted lines in Fig. 9, and the tongue or gate 31 is then opened. Or the link may be moved back over the tongue or gate 31 and be itself used to pull the gate open, whereupon the link can be removed from the tongue 31 itself, instead of from the body of the hook. If the user then wishes to remove the connector from the side chain, it is only necessary to slip the body portion of the hook back through the link of the side chain, turn it over, and lift out the hook portion 34. The other end of the cross chain may be removed in the same way.

As explained above, the rear ends of these connectors 18 are made of a width substantially equal to the inner sides of the links themselves, so that the pull upon these side chains will be more or less equalized, and there will be no tendency for the hooks to slide to one or the other end of the link, thus twisting the links of the side chain.

When the connectors are used as shown at the top of Fig. 7, the connectors 18 are engaged in the longitudinal slots of the special links 23, instead of through the links of the side chains proper. But they are engaged with these links just as they are engaged with the links of the side chains. The end 34 of the connector is inserted downwardly through the slot 25 of the link, then moved therethrough until the wide end 33 rests in the slot. This covers up the seat 27, Fig. 6, in which rests the link of the side chain, and prevents its removal. The end link of the cross chain 13 is then engaged with the free end of the connector as described above. The other connector is used the same way.

To remove the cross chain, it is only necessary to reverse the steps. When one of the connectors has been removed, the side chain which it holds in place can be removed from its seat 27 and withdrawn from the link, thus releasing the side chain. The connector at the other end of the cross chain can be removed in the same way, and that side chain then disconnected. The entire chain can then be removed.

If special precaution against the possibility of the cross chain accidentally displacing the gate 31 of the connector is necessary, then the form shown in Fig. 16 is used, wherein the guards or projections 38 make it impossible for the link of the cross chain to engage the gate without one end thereof also engaging the side of the hook 34, thus locking the parts against accidental displacement.

Having thus explained the character and nature of the invention, what I claim is:

1. In an anti-skid chain, the combination of side chains comprising independent sections, connecting links for the sections each connecting link having provisions for connecting thereto the end link of one of the side chain sections and having a seat for receiving the end link of another side chain section, and having a longitudinal slot communicating with the seat for receiving the end link of the side section, cross chains, and connectors for uniting the cross chains to the connecting links, the connectors being interlocked with the connecting links by being passed through the slot so that the one end of each connector lies over the recess for the end link of the side chain, whereby the side chains are locked in position by the connectors.

2. In an anti-skid chain, the combination of side chains, connecting links for the chains each link having recesses therein for receiving end links of the side chains and a longitudinal slot above the recesses but communicating therewith, cross chains, and connectors each having one end secured to a cross chain and the other resting in the longitudinal slot of a connecting link above the recesses therein so as to retain the end links of the side chains in the recesses of the links.

3. An anti-skid chain comprising side chains, the links of which all lie in the same plane, connecting links therefor each having a base portion adapted to lie in the plane of the links and another portion in a position at an angle thereto, the angular portion of the links being each provided with a slot longitudinal thereof and another slot leading from the first mentioned slot through the side of the link, and the base portion of the links having formed therein recesses in which the ends of the links of the side chains may rest, cross chains each having connectors one at either end thereof and each having one of its ends lying in the longitudinal slot of a connecting link and in a positon to prevent the withdrawal of the links of the side chains.

4. A connector for anti-skid chains and similar structures comprising a base, a hook shaped member connected to the base at one end thereof by a section having a width substantially equal to the inner length of the links of a chain with which it is to be used, another hook shaped member connected to the base at the other end of the base and having the neck thereof of a width adapted to fit the end link of a chain with which it is to be used and cooperating with the first hook shaped member to form an opening between them, a gate for the connector pivoted on the first hook shaped member and having the other end shaped to rest within the second hook shaped member, and means cooperating with the gate to prevent the chain reaching the gateway while the gate is closed.

5. A connector for anti-skid chains comprising a base, a top member connected to one end of the base, a hook connected to the other end of the base, and a gate for the connector pivoted at one end to the top member and having its other end shaped to rest within the hook of the connector the gate having on its sides guards to prevent a chain link with which the hook may be engaged from passing onto the gate.

6. A chain link comprising a plate having a base portion and a portion standing at an angle thereto, and having a slot in the angular portion, a seat for a chain link communicating with the slot, and an opening leading from the slot through one side of the plate, so that a chain link may be passed through the opening then through the slot and into the seat.

7. A chain link comprising a plate having a base portion and a portion standing at an angle thereto, and having a slot in the angular portion, a seat for a chain link near one end of the slot and communicating therewith, means for securing another link to the plate, and the plate having another slot leading from the first mentioned slot through the side of the plate, so that a link may be passed through the slots into the seat.

8. A connecting link for chains comprising an elongated plate having therein a recess adapted to receive the link of a chain, a slot formed longitudinally of the plate and of a length to extend over the top of the recess, and another slot extending from the longitudinal slot transversely through one side of the plate, so that a link may be passed through the slots into the recess.

9. A connecting link for chains comprising a plate having in each end thereof a recess adapted to receive the end link of a chain, and having a slot running longitudinally of the plate and of a length to extend over the tops of the recesses, and having another slot extending from the longitudinal slot transversely through one side of the plate so as to permit the links to be inserted in and removed from the recesses.

10. A connecting link for chains comprising a plate having a base and a side standing at an angle to each other, one of the parts having a longitudinal slot formed therein and an opening leading from the slot through the edge of the plate, and the other having a recess communicating with the longitudinal slot in the other part in which the end link of a chain is adapted to rest.

11. A connecting device for chains comprising a link having therein a longitudinal slot and another slot leading therefrom through the side of the link, and having recesses one in either end thereof which recesses communicate with the longitudinal slot so that chain links may be inserted through the slots to their respective recesses; and a connector for a cross chain one end thereof having a width substantially equal to the length of the slot in the link so as to rest over the links as they lie in their respective recesses to prevent the displacement thereof.

12. A connector for anti-skid chains, comprising a base, a top member connected to one end of the base, a hook connected to the other end of the base, a gate pivoted at one end to the top member and adapted to close the opening between the top member and the hook, and means operating in conjunction with the gate to prevent the chain which may be engaged by the hook from reaching the opening while the gate is closed.

13. A connector for anti-skid chains comprising a base, a top member connected to one end of the base, a hook connected to the other end of the base, a gate for the connector pivoted at one end to the top member and adapted to close the opening between the top member and the hook, and an enlargement on the gate of a size to prevent the link of a chain which may be engaged by the hook from passing on to the gate.

14. A connector for anti-skid chains comprising a base, a top member connected to one end of the base, a hook connected to the other end of the base, a gate to close the opening between the top member and the hook, said gate being pivotally mounted on the top member and being made of such a width as to prevent the link of the chain to be engaged in the hook from passing on to the gate.

15. A connector for anti-skid chains, comprising a base, a top member connected to one end of the base, a hook connected to the other end of the base, a gate pivoted at one end to the top member, and a guard on the gate of a width substantially equal to the space between the top member and the hook and of such a size as to prevent the link of a chain to be engaged by the hook from passing on to the gate.

16. A connector for anti-skid chains, comprising a base, a top member connected to one end of the base, a hook connected to the other end of the base, a gate for closing the opening between the top member and the hook pivoted at one end to the top member and having its other end shaped to rest within the hook of the connector, and means on the gate to prevent the link of the chain from passing on to the gate.

NORMAN E. BROOKE.